US012754170B2

(12) United States Patent
Trainoff

(10) Patent No.: US 12,754,170 B2
(45) Date of Patent: Oct. 6, 2026

(54) REGULATING A CHANNEL TEMPERATURE OF A FIELD FLOW FRACTIONATOR

(71) Applicant: Wyatt Technology, LLC, Goleta, CA (US)

(72) Inventor: Steven P. Trainoff, Santa Barbara, CA (US)

(73) Assignee: Wyatt Technology, LLC, Goleta, CA (US)

( * ) Notice: Subject to any disclaimer, the term of this patent is extended or adjusted under 35 U.S.C. 154(b) by 915 days.

(21) Appl. No.: 17/502,027

(22) Filed: Oct. 14, 2021

(65) Prior Publication Data

US 2022/0113286 A1 Apr. 14, 2022

Related U.S. Application Data

(60) Provisional application No. 63/091,798, filed on Oct. 14, 2020.

(51) Int. Cl.

| | |
|---|---|
| ***G01N 30/00*** | (2006.01) |
| ***G01N 1/40*** | (2006.01) |
| ***G05D 23/19*** | (2006.01) |

(52) U.S. Cl.

CPC ....... *G01N 30/0005* (2013.01); *G01N 1/4077* (2013.01); *G05D 23/19* (2013.01)

(58) Field of Classification Search

CPC ... G01N 30/0005; G01N 1/4077; G05D 23/19

See application file for complete search history.

(56) References Cited

U.S. PATENT DOCUMENTS 5,475,610 A * 12/1995 Atwood .............. B01L 3/50851 422/943

6,136,171 A * 10/2000 Frazier ................ B81C 1/00357 209/127.1

(Continued)

FOREIGN PATENT DOCUMENTS

WO 2004076056 A2 10/2004

OTHER PUBLICATIONS

Kirkland; thermal-field-flow-fractionation-of-polymers-with-exponential-temperature-programming, Macromolecules 1985 (Year: 1985).*

(Continued)

*Primary Examiner* — Bobby Ramdhanie

*Assistant Examiner* — Boi-Lien Thi Nguyen

(74) *Attorney, Agent, or Firm* — Schmeiser Olsen, PLLC

(57) ABSTRACT

The present disclosure describes an apparatus of regulating a channel temperature of a field flow fractionator. In an embodiment, the apparatus includes a thermal conducting block including a top surface, and a bottom surface, where the top surface of the block is configured to be in contact with a bottom surface of a bottom plate assembly of a field flow fractionator, where the bottom plate assembly includes a material with high thermal conductivity, a heater attached to the block where the heater is configured to heat the block, a temperature sensor attached to the block, where the sensor is configured to measure a block temperature of the block, a temperature controller configured to measure a channel temperature of a channel of the field flow fractionator and configured to be connected to the heater and to the temperature sensor, and where the block is configured to heat the bottom plate assembly.

18 Claims, 11 Drawing Sheets

(56) References Cited

U.S. PATENT DOCUMENTS

| | | | | |
|---|---|---|---|---|
| 6,556,940 | B1 * | 4/2003 | Tretiakov | B01L 7/52<br>702/132 |
| 2003/0200795 | A1 * | 10/2003 | Gerner | G01N 30/30<br>73/61.52 |
| 2005/0186585 | A1 * | 8/2005 | Juncosa | B01L 7/525<br>435/287.2 |
| 2008/0003689 | A1 | 1/2008 | Lee et al. | |
| 2008/0210001 | A1 * | 9/2008 | Kanne | B01L 3/502715<br>73/204.17 |
| 2009/0301942 | A1 * | 12/2009 | Wyatt | G01N 30/0005<br>209/250 |
| 2020/0408726 | A1 * | 12/2020 | Trainoff | G01N 30/0005 |

OTHER PUBLICATIONS

Edwards (A Microfabricated Thermal Field-Flow Fractionation System, Anal. Chem. 2002,74, 1211-1216) (Year: 2002).*
Kirkland (Thermal field-flow fractionation of polymers with exponential temperature programming, Macromolecules, vol. 18, No. 11, 1985) (Year: 1985).*
International Search Report and Written Opinion in PCT/US2022/046797 mailed on Jan. 27, 2023.
Edwards, T., et al., "A Microfabricated Thermal Field-Flow Fractionation System", Feb. 2002, Analytical Chemistry, vol. 74, No. 6, pp. 1211-1216.
International Preliminary Report on Patentability in PCT/US2022/046797 mailed on Apr. 25, 2024.
Extended Search Report in European Patent Application No. 22881866.2 mailed on Aug. 8, 2025.

* cited by examiner

REGULATING A CHANNEL TEMPERATURE OF A FIELD FLOW FRACTIONATOR

PRIORITY

This application claims priority to U.S. Provisional Patent Application No. 63/091,798, filed Oct. 14, 2020.

BACKGROUND

The present disclosure relates to field flow fractionators, and more specifically, to regulating a channel temperature of a field flow fractionator.

SUMMARY

The present disclosure describes an apparatus of regulating a channel temperature of a field flow fractionator. In an exemplary embodiment, the apparatus includes (1) a thermal conducting block including a top surface, and a bottom surface, where the top surface of the block is configured to be in contact with a bottom surface of a bottom plate assembly of a field flow fractionator, where the bottom plate assembly includes a material with high thermal conductivity, (2) a heater attached to the block where the heater is configured to heat the block, (3) a temperature sensor attached to the block, where the sensor is configured to measure a block temperature of the block, (4) a temperature controller configured to measure a channel temperature of a channel of the field flow fractionator and configured to be connected to the heater and to the temperature sensor, and (5) where the block is configured to heat the bottom plate assembly.

DETAILED DESCRIPTION

Figure 1A:
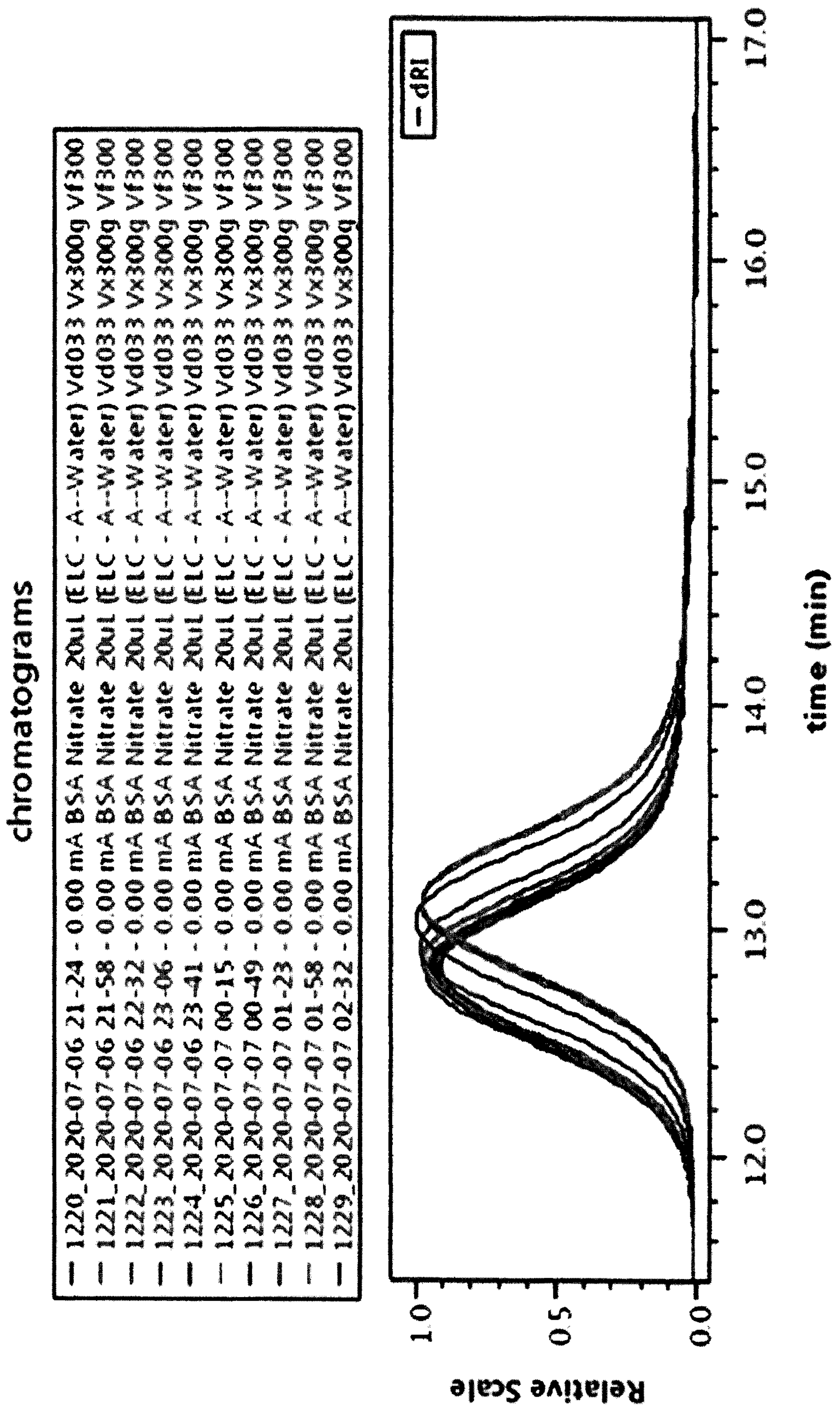
FIG. 1A (PRIOR ART)
FIG. 1A depicts a graph in accordance with an existing field flow fractionator.

The present disclosure describes an apparatus of regulating a channel temperature of a field flow fractionator. In an exemplary embodiment, the apparatus includes (1) a thermal conducting block including a top surface, and a bottom surface, where the top surface of the block is configured to be in contact with a bottom surface of a bottom plate assembly of a field flow fractionator, where the bottom plate assembly includes a material with high thermal conductivity, (2) a heater attached to the block where the heater is configured to heat the block, (3) a temperature sensor attached to the block, where the sensor is configured to measure a block temperature of the block, (4) a temperature controller configured to measure a channel temperature of a channel of the field flow fractionator and configured to be connected to the heater and to the temperature sensor, and (5) where the block is configured to heat the bottom plate assembly. In an embodiment, the thermal conducting block includes at least one aluminum, copper, and stainless steel. In an embodiment, the thermal conducting block is at least one aluminum, copper, and stainless steel. In an embodiment, the bottom plate assembly includes a material with a thermal conductivity greater than 10 W/m-deg K. In an embodiment, the bottom plate assembly is a material with a thermal conductivity greater than 10 W/m-deg K. In an embodiment, the bottom plate assembly includes a material that is not plastic. In an embodiment, the bottom plate assembly is a material that is not plastic.

In an embodiment, the heater includes a thin-film heater. In an embodiment, the heater is a thin-film heater. Such a thin-film heater could generated uniform heat and could have a low/thin profile. In an embodiment, the field flow fractionator includes the temperature controller.

The present disclosure describes an inexpensive assembly that integrated with a FFF channel. The apparatus could measure the channel temperature of a FFF and with a feedback system regulates the temperature of the FFF. The apparatus could operate from ambient to 55 degrees C. and could provide reproducible elution of sample peaks, thereby improving the accuracy and utility of the FFF system.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Symmetric Flow Cross Flow Fractionator (SFIFFF)

As an illustration of the separation of particles by field flow fractionation, a simplification of perhaps the most straightforward system, a SFIFFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SFIFFF. The elements of an A4F channel may include (1) a bottom assembly structure holding a liquid-permeable frit surrounded by a sealing O-ring, (2) a permeable membrane that lies on the frit, (3) a spacer of thickness from about 75 μm to 800 μm into which has been cut a cavity, and (4) a top assembly structure generally holding a transparent plate of polycarbonate material or glass.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in spacer serves as the channel in which separation will occur. The top assembly structure usually contains three holes, called ports, that pass through the top plate and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Field flow fractionation (FFF) systems are commonly used to fractionate particles and molecules by applying a field to a fluid sample so that the particles accumulate against an accumulation wall. For Asymmetric Flow FFF (A4F), sample bearing fluid is passed through a semi-permeable membrane which allows the solvent to pass, but retains the sample. The membrane surface forms the accumulation wall and the flow through the membrane is called the cross flow. The Stokes force on the particles causes a flux that pushes the sample towards the membrane. Diffusion of the high concentration near the membrane creates a flux upwards that counteracts the Stokes force. The equilibrium of these fluxes gives rise to an exponential concentration profile, which is maximal on the membrane surface and decays into the bulk. Different size particles will have a different balance between these two fluxes. Large particles will have a large Stokes flux and a small diffusion flux compared to smaller particles, giving rise to a smaller exponential decay length. Both large and small particles have a maximal concentration on the wall, but the smaller ones protrude further into the bulk.

During the fractionation process, a channel flow is applied that is parallel to the planes. Pouiselle flow between the parallel plates produces a velocity shear at the boundary. The smaller particles, which protrude further into the bulk, travel downstream more rapidly than large particles and so elute first, followed by increasingly large particles. This is the well-known FFF mechanism. The exponential concentration decay length that is at the heart of the fractionation mechanism depends on the solvent temperature through the diffusion constant and the Stokes force. The diffusion constant has an explicit temperature dependence from Brownian motion and an implicit temperature dependence from the solvent viscosity as seen in the Stokes Einstein relation $$F_d = 6\pi\eta v,$$

where $k_B$ is Boltzmann's constant, T is temperature, η is the temperature dependent viscosity, and r is the particle radius. The Stokes force also depends on temperature through the solvent viscosity $$D = (k_B T)/(6\pi\eta r),$$

where v is the velocity of the particle relative to the solvent. The FFF theory can be used to relate the measured elution time to the underlying particle size. It is clear that an input to the theory is the channel temperature so it should be measured, and that for the best reproducibility the temperature should be held constant.

Current Technology

The simplest way to achieve this is to put the FFF channel inside a thermally controlled oven. One such solution was sold by Superon GMBH as the Thermos product that allowed the channel to be temperature regulated from 4 C to 90 C. This is quite effective, but such a solution is large and relatively expensive. The subject of this disclosure is to describe a simple, low cost temperature regulation mechanism that can be integrated with the channel assembly.

FIG. 1A depicts a number of replicate injections of the system in room without the thermal stabilization system for a prior art field flow fractionator (FFF). Specifically, FIG. 1A depicts replicate injections of 30 nm polystrene latex sphere on prior art FFF system without temperature control.

Figure 1B:
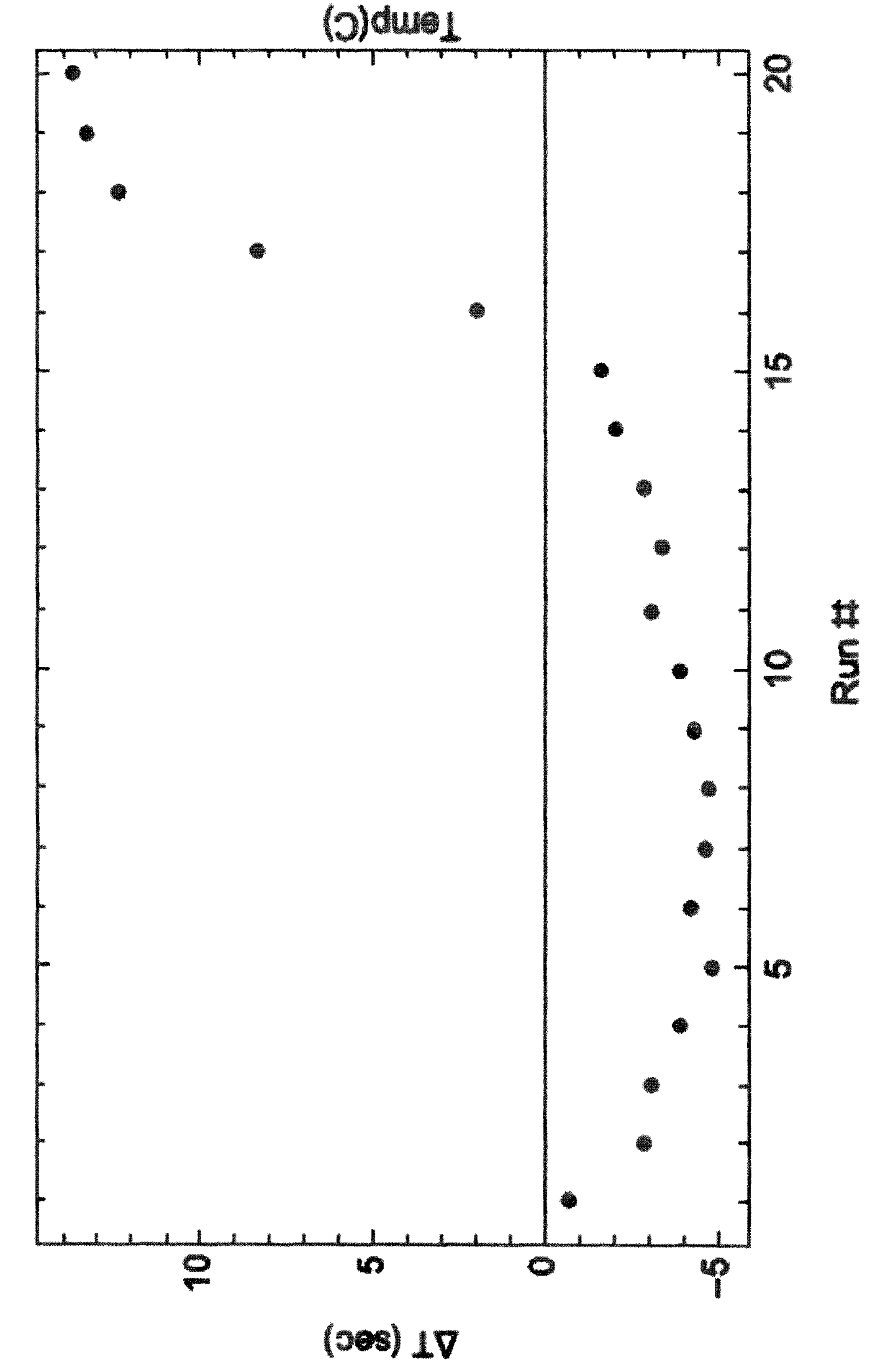
FIG. 1B (PRIOR ART)
FIG. 1B depicts a graph in accordance with an existing field flow fractionator.
Figure 1C:
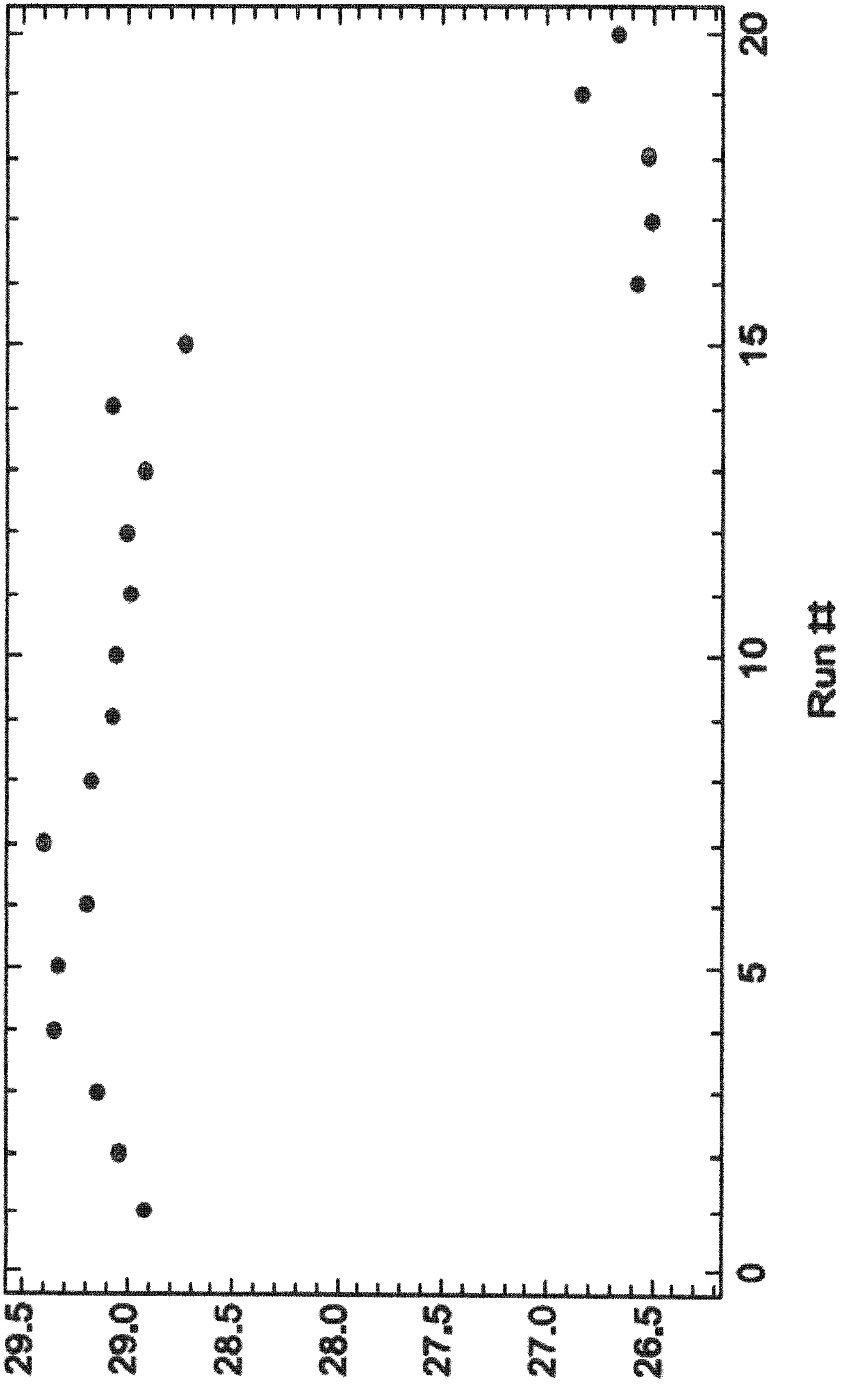
FIG. 1C (PRIOR ART)
FIG. 1C depicts a graph in accordance with an existing field flow fractionator.

FIG. 1B depicts the arrival time of the leading edges of the peaks, and FIG. 1C depicts the measured chassis temperature for a prior art FFF. The lab where the experiment was conducted has the air conditioning turned off each night as a cost savings measure. The experiment was run overnight and the large step in the data and chassis temperature occurred when the air conditioning was turned on the next morning and the room began to cool. It is clear that when the temperature is not controlled, the peak arrive time is not well controlled, illustrating the problem that is to be solved. FIG. 1B depicts peak arrival time for a prior art FFF, while FIG. 1C depicts measured chassis temperature of the prior art FFF. Thus, there is a need to regulate a channel temperature of a field flow fractionator.

Referring to FIG. 2A, FIG. 2B, FIG. 2C, FIG. 2D, and FIG. 2E in an exemplary embodiment, the apparatus includes (1) a thermal conducting block including a top surface, and a bottom surface, where the top surface of the block is configured to be in contact with a bottom surface of a bottom plate assembly of a field flow fractionator, where the bottom plate assembly includes a material with high thermal conductivity, (2) a heater attached to the block where the heater is configured to heat the block, (3) a temperature sensor attached to the block, where the sensor is configured to measure a block temperature of the block, (4) a temperature controller configured to measure a channel temperature of a channel of the field flow fractionator and configured to be connected to the heater and to the temperature sensor, and (5) where the block is configured to heat the bottom plate assembly.

In order to achieve the benefit of reproducible elution, one only needs to keep the temperature of the channel constant, one does not need to varying over a wide range. So long at the channel assembly is constructed from materials with high thermal conductivity all that is required to hold its temperature constant is a small temperature regulated stage consisting of an aluminum block, a thin film heater, a temperature sensor, and a safety thermostat. This can be attached to the bottom of the channel assembly. A controller in the instrument reads the channel temperature and adjusts the heater to keep the assembly temperature constant.

Figure 2A:
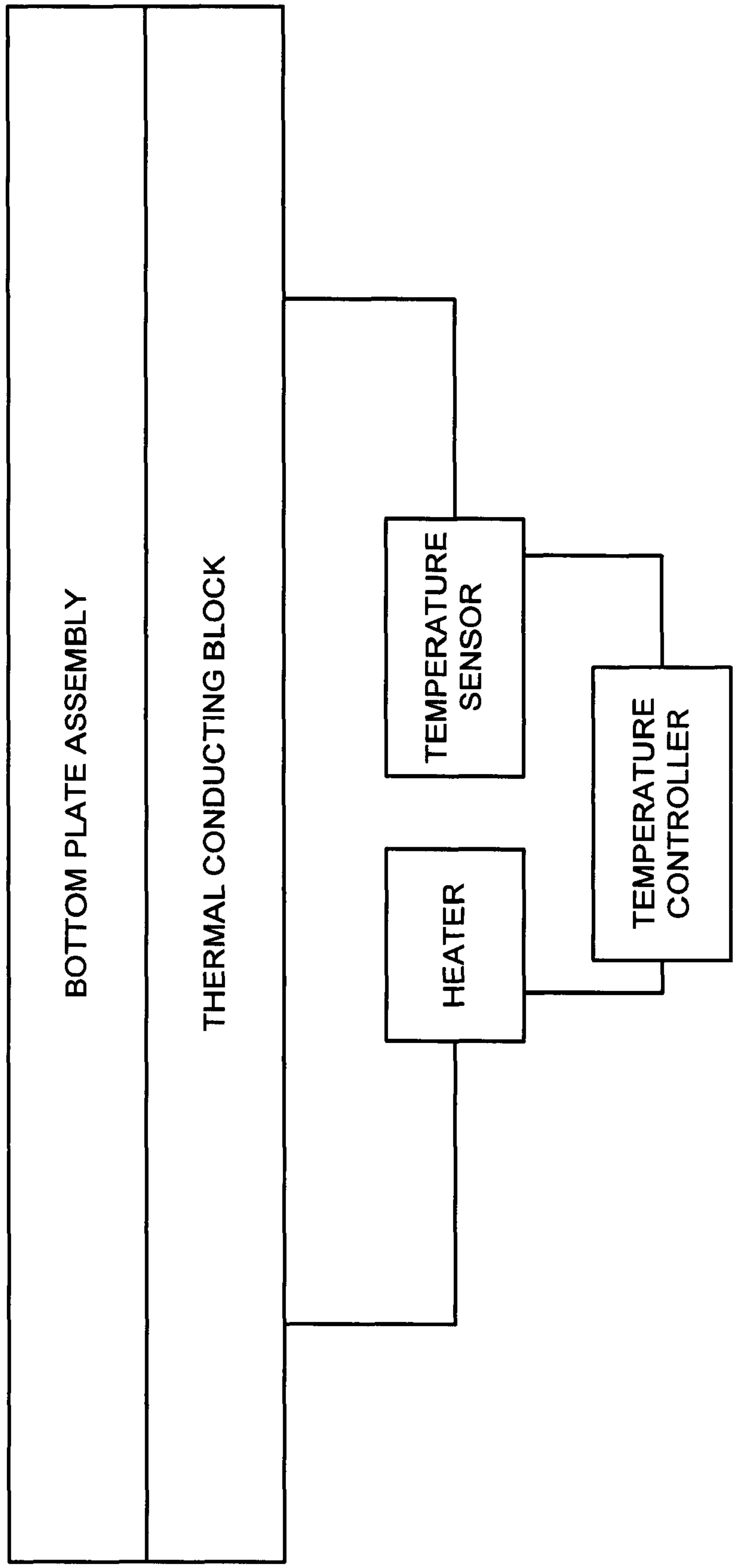
FIG. 2A depicts an apparatus in accordance with an exemplary embodiment.
Figure 2B:
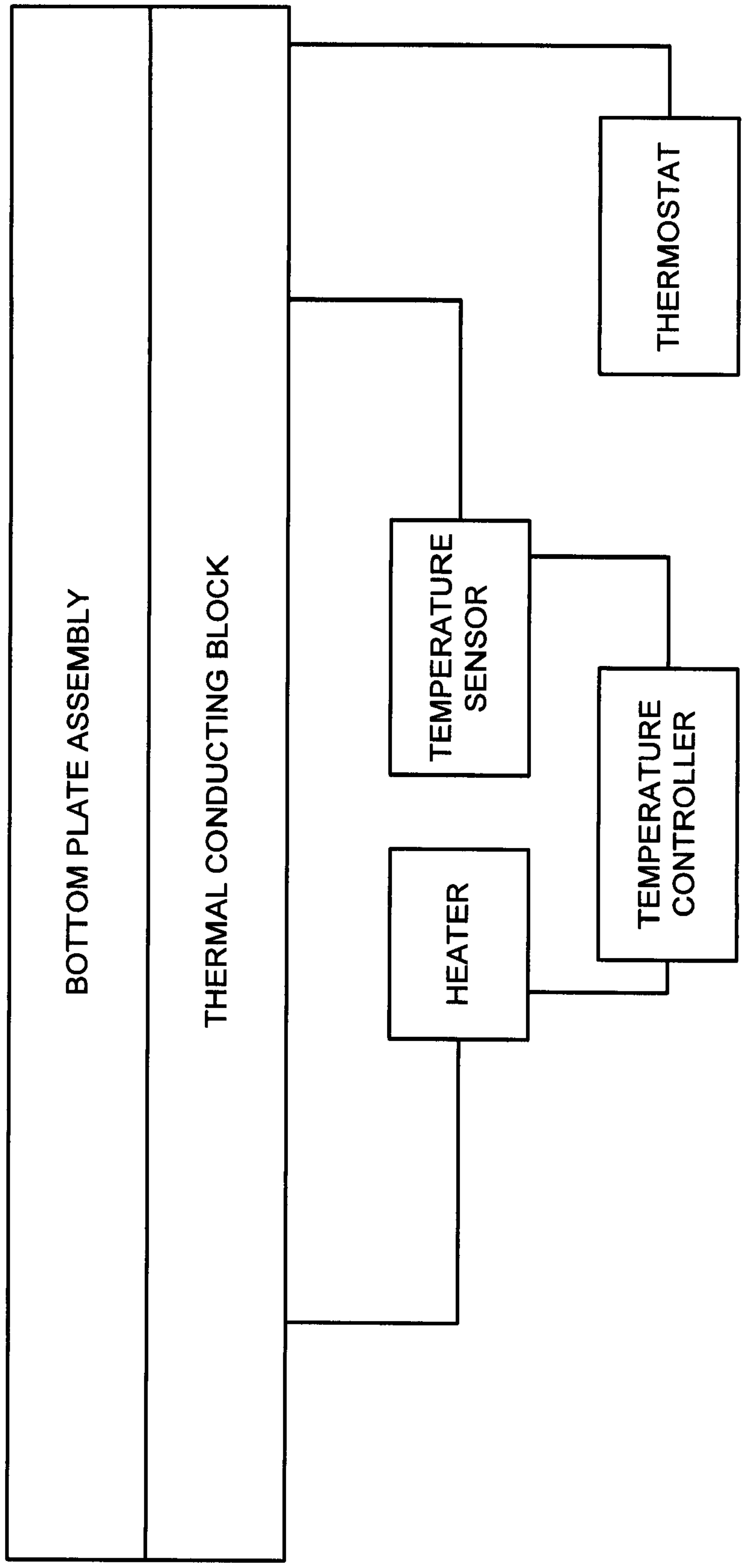
FIG. 2B depicts an apparatus in accordance with an exemplary embodiment.
Figure 2C:
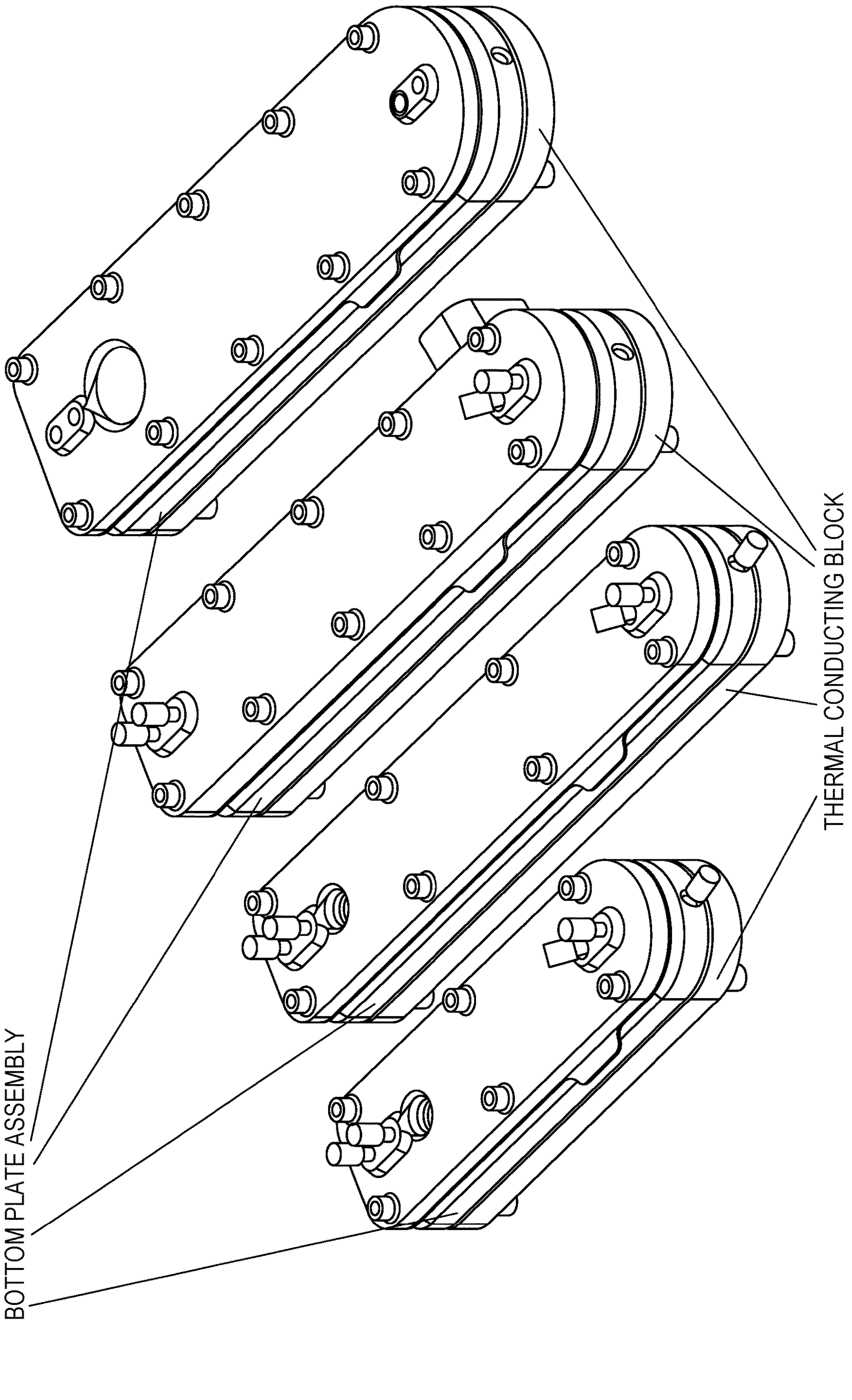
FIG. 2C depicts an apparatus in accordance with an exemplary embodiment.
Figure 2D:
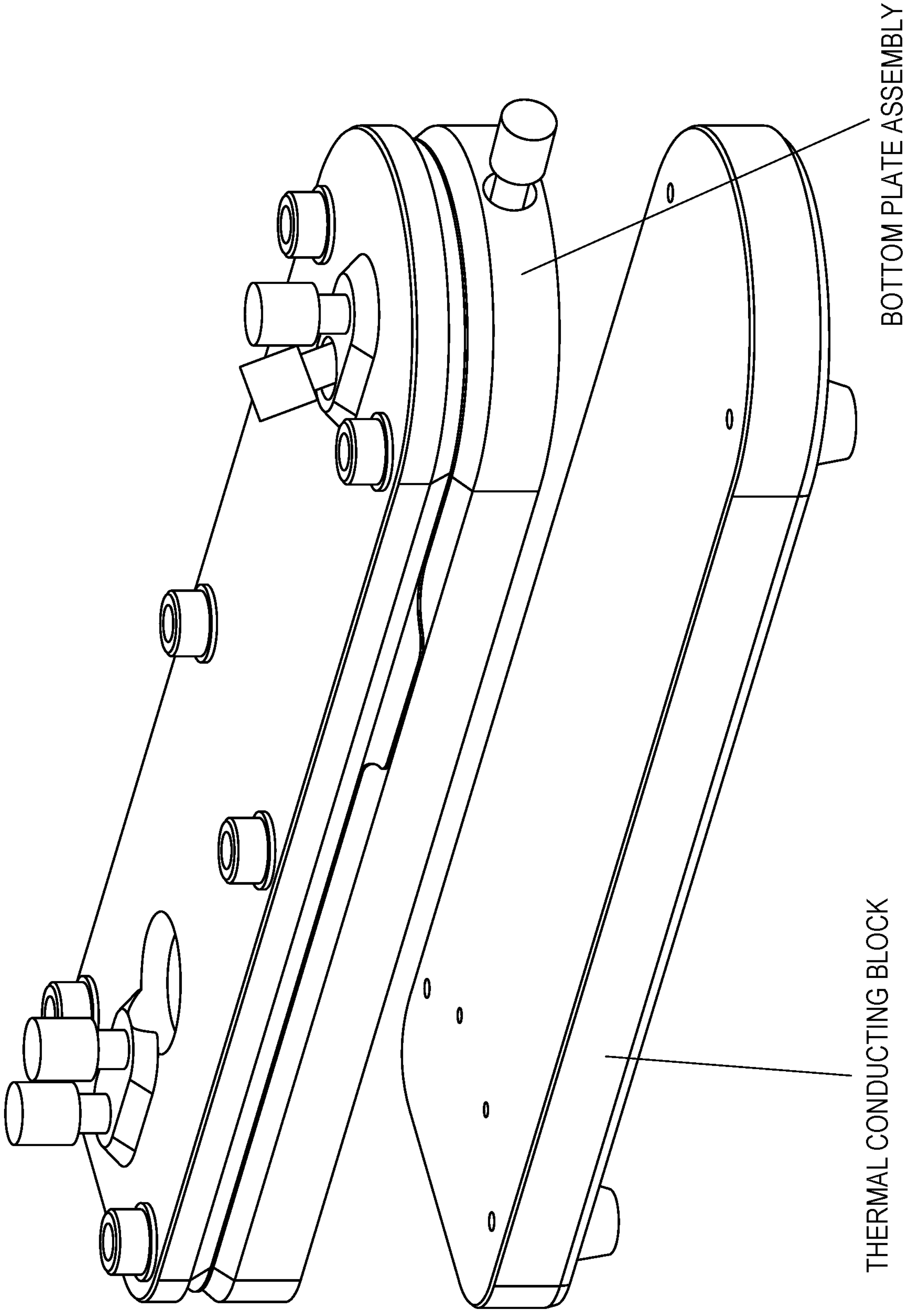
FIG. 2D depicts an apparatus in accordance with an exemplary embodiment.

FIG. 2D depicts the interior of the FFF channel temperature assembly. There is a cover that encloses the electronics and the assembly is bolted underneath a FFF channel.

This assembly is bolted underneath a FFF channel to provide intimate thermal contact, although it could be glued or simply stacked so that gravity holds the assembly together. The entire assembly has enough thermal mass that it can maintain a stable temperature to better than 0.01C in the room without the need for any insulation or an external box. This is sufficient to provide reproducible separations and is compact enough that, unlike a chromatography oven, it does not require any additional lab bench space.

Thermal Conducting Block

In an embodiment, the block is bolted to the bottom surface. In an embodiment, the block is bolted to the bottom surface of the bottom plate assembly of the field flow fractionator. In an embodiment, the block is glued to the bottom surface. In an embodiment, the block is glued to the bottom surface of the bottom plate assembly of the field flow fractionator.

Figure 2E:
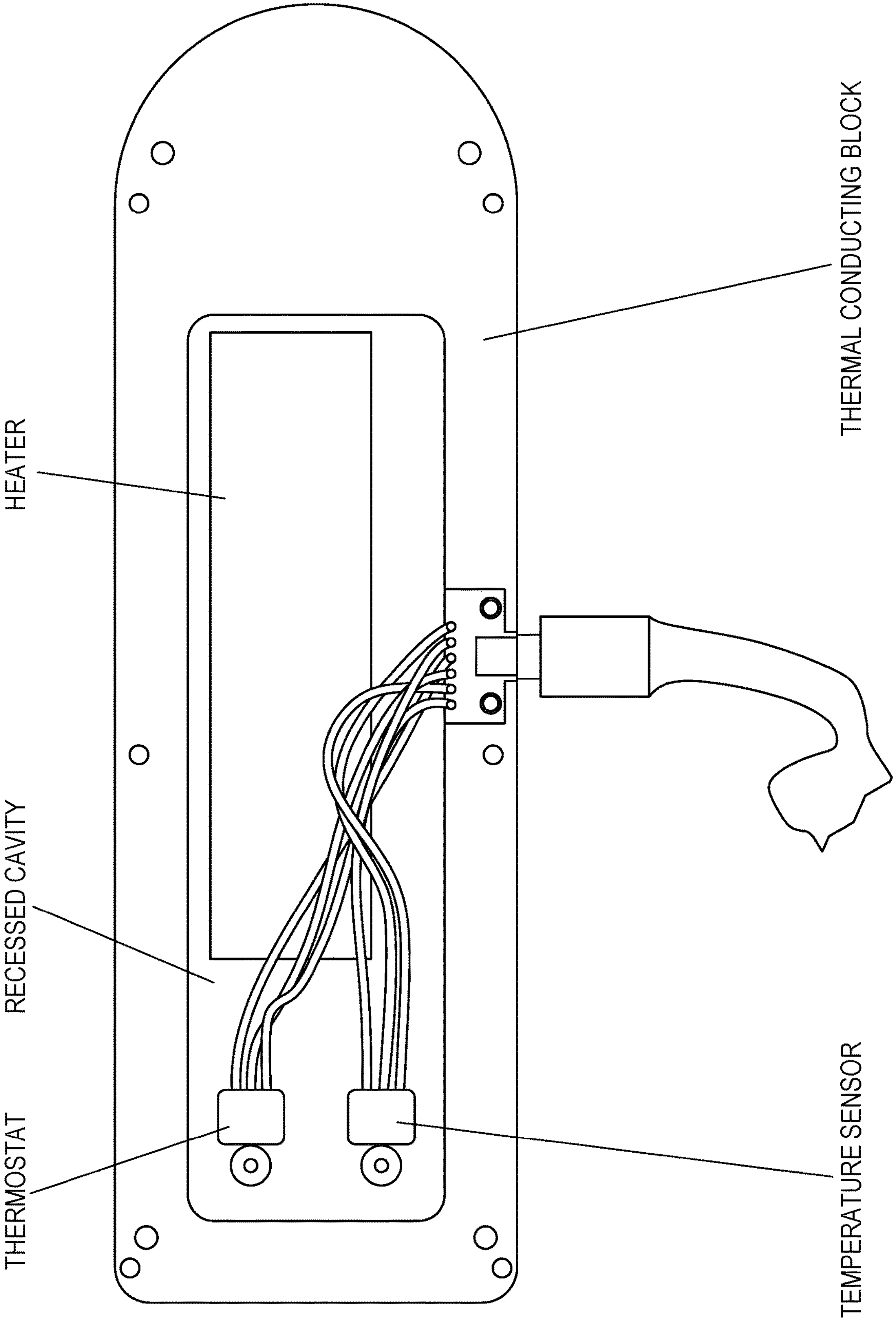
FIG. 2E depicts an apparatus in accordance with an exemplary embodiment.
Figure 3:
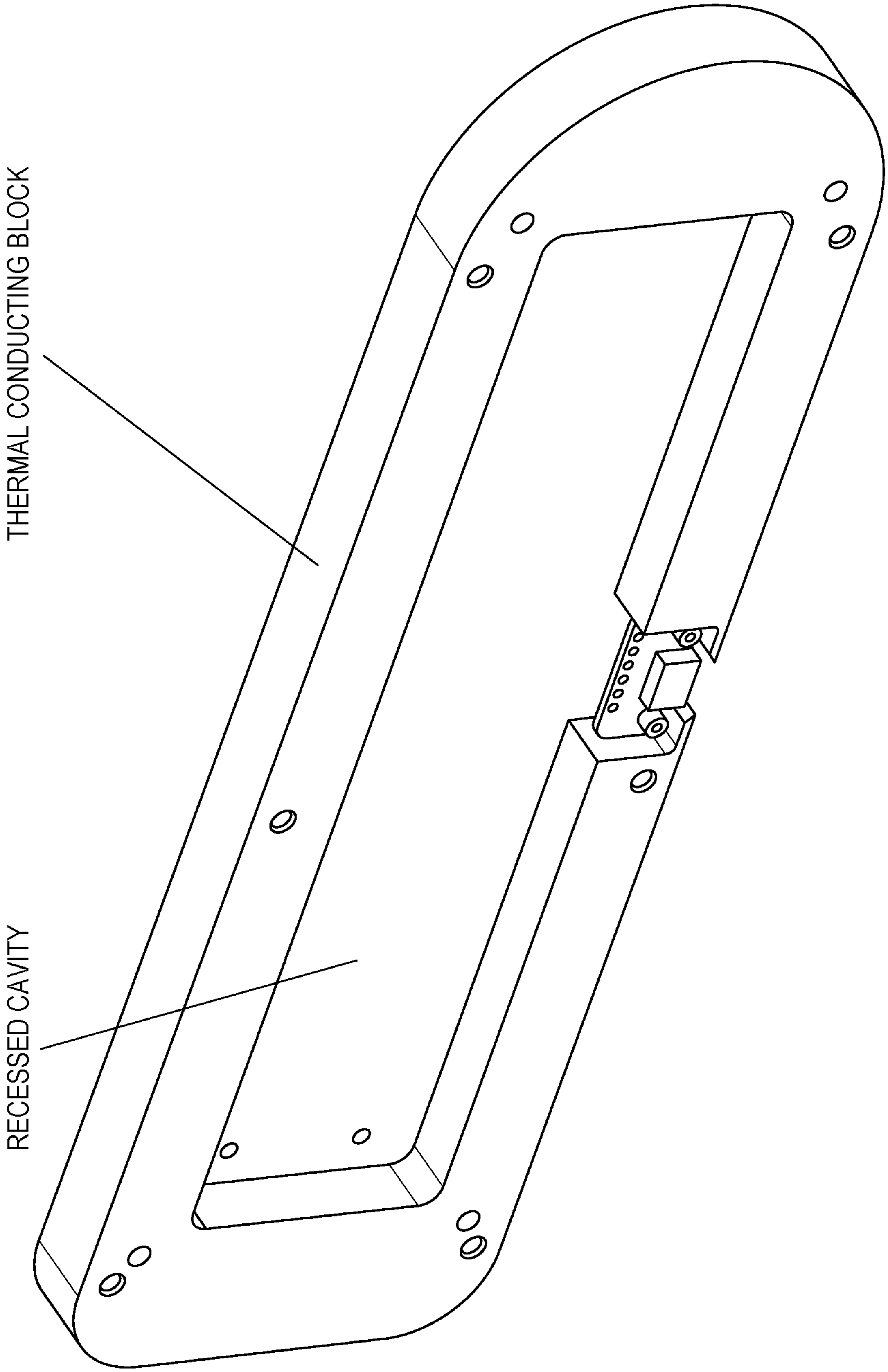
FIG. 3 depicts an apparatus in accordance with an exemplary embodiment.
Figure 4:
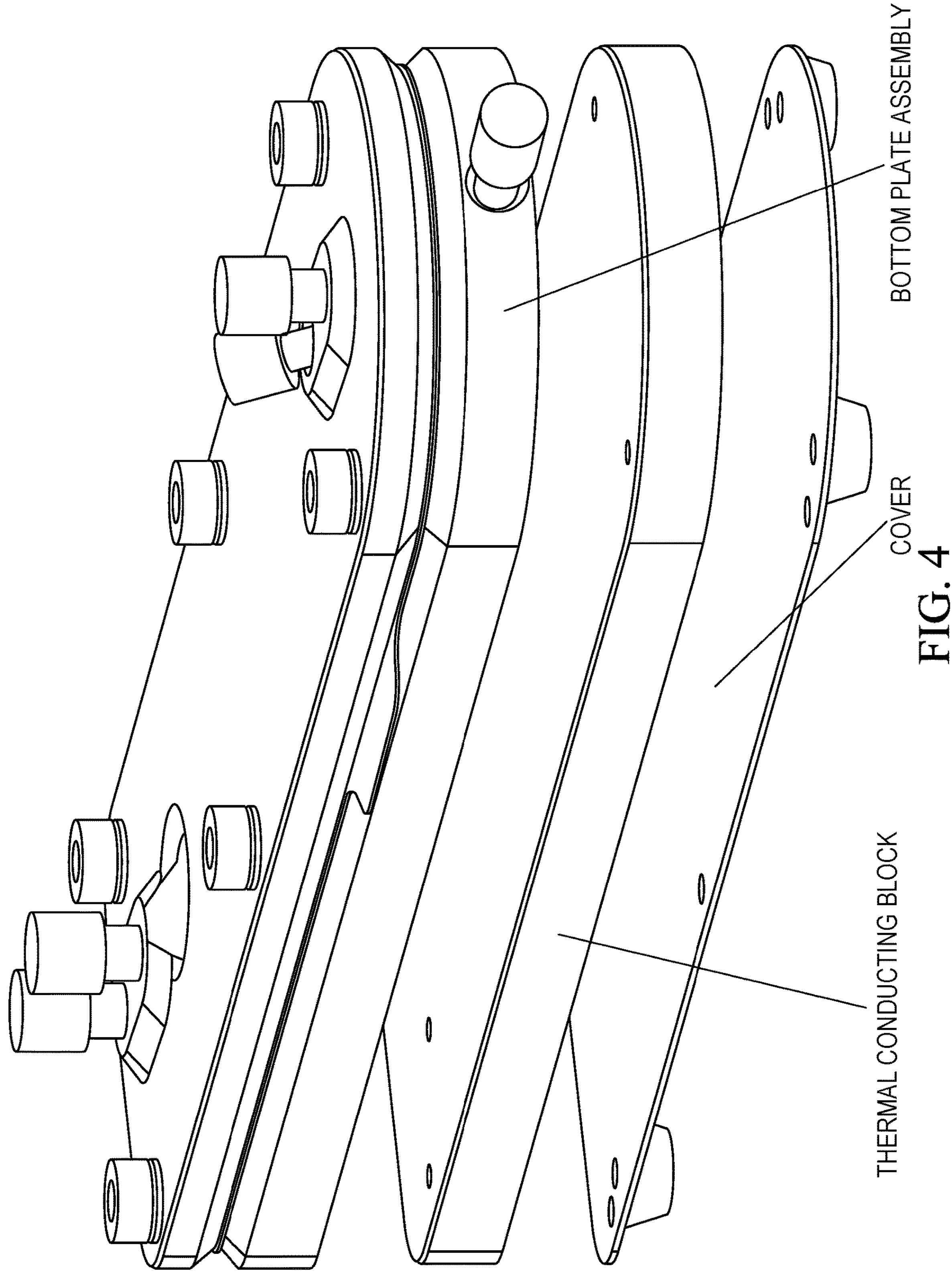
FIG. 4 depicts an apparatus in accordance with an exemplary embodiment.

In an embodiment, as depicted in FIG. 2E and FIG. 3, the block includes a recessed cavity, where the heater is attached to the recessed cavity, and where the temperature sensor is attached to the recessed cavity. In an embodiment, as depicted in FIG. 4, a cover could cover the recessed cavity, thereby covering the heater and the sensor. In an embodiment, the thermostat is attached to the recessed cavity. In an embodiment, the cover could cover the recessed cavity, thereby covering the thermostat. In an embodiment, a thermal mass of the block is sufficient such that the apparatus is able to maintain the block temperature with a temperature stability of less than or equal to 0.01 degrees C., without insulation.

Thermostat

In an embodiment, the apparatus further includes a thermostat attached to the block. The thermostat could improve the safety of the apparatus.

Thermally Conductive Material

In an embodiment, the apparatus further includes a thermally conductive material between the block and the bottom surface. In an embodiment, the thermally conductive material is one of a SIL-pad and a thermal paste. The thermally conductive material could improve thermal contact between the block and the bottom surface. The thermally conductive material could ensure thermal contact between the block and the bottom surface.

EXAMPLE

Figure 5:
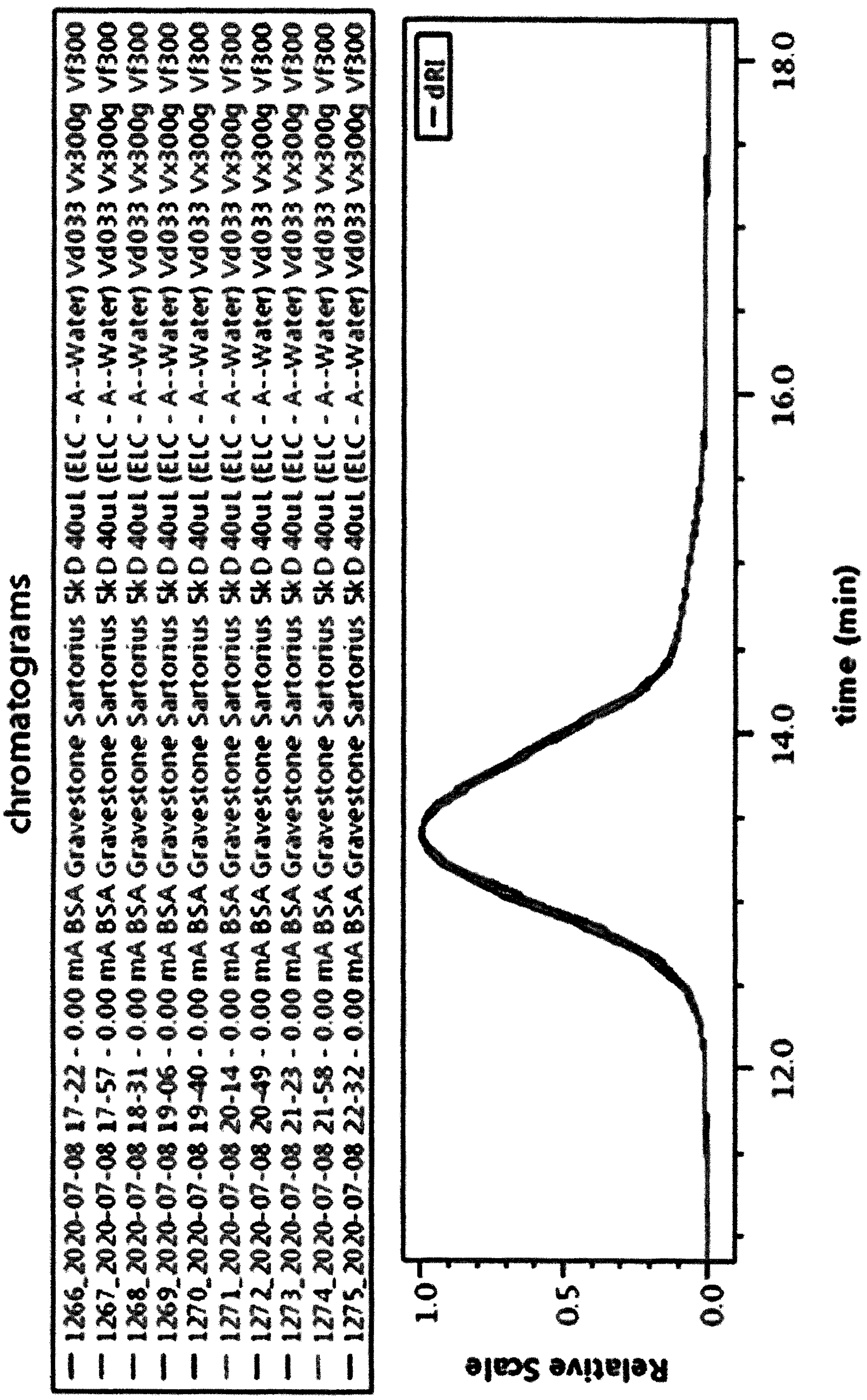
FIG. 5 depicts a graph in accordance with an exemplary embodiment.

FIG. 5 depicts results from a FFF run with the channel temperature regulated to 30 degrees C. using the apparatus described in this disclosure. All of the traces overlay nearly perfectly, demonstrating that the problem is solved. This was taken in the same room as the prior art data set and had similar changes in the ambient temperature. FIG. 5 depicts the effectiveness of the channel temperature regulation system of the apparatus disclosed.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:

a field flow fractionator having a channel and a bottom plate assembly comprising a thermally conductive material below the channel;

a block comprising a thermally conductive material and having a top surface and a bottom surface, wherein the top surface is in contact with a bottom surface of the bottom plate assembly;

a heater below the channel and attached to the bottom surface of the block and separated from the channel by the block and the bottom plate assembly, wherein the heater is configured to heat the block;

a temperature sensor attached to the block, wherein the temperature sensor is configured to measure a block temperature of the block;

a temperature controller configured to measure a channel temperature of the channel and configured to be connected to the heater and to the temperature sensor and control a temperature of the block; wherein the temperature controller is configured to adjust the heater to maintain the channel temperature constant, and wherein the block is configured to heat the bottom plate assembly.

2. The apparatus of claim 1 further comprising a thermostat attached to the block.

3. The apparatus of claim 1 wherein the block is bolted to the bottom surface.

4. The apparatus of claim 1 wherein the block is glued to the bottom surface.

5. The apparatus of claim 1 wherein the block comprises a recessed cavity, wherein the heater is attached to the recessed cavity, and wherein the temperature sensor is attached to the recessed cavity.

6. The apparatus of claim 2 wherein the block comprises a recessed cavity, wherein the thermostat is attached to the recessed cavity.

7. The apparatus of claim 1 wherein a thermal mass of the block is sufficient such that the apparatus is able to maintain the block temperature with a temperature stability of less than or equal to 0.01 degrees C., without insulation.

8. The apparatus of claim 1 further comprising a thermally conductive material between the block and the bottom surface.

9. The apparatus of claim 1 wherein the field flow fractionator comprises the temperature controller.

10. A method of regulating a channel temperature of a field flow fractionator, the method comprising:

heating, by a heater attached to a bottom surface of a block comprising a thermally conductive material, the block, wherein a top surface of the block is in contact with a bottom surface of a bottom plate assembly of the field flow fractionator, wherein the bottom plate assembly comprises a thermally conductive material below a channel of the field flow fractionator, wherein the heater is below the channel and separated from the channel by the block and the bottom plate assembly;

measuring, by a temperature sensor attached to the block, a block temperature of the block;

measuring, by a temperature controller connected to the heater and to the temperature sensor, a channel temperature of the channel; and adjusting, by the temperature controller, the heater to maintain the channel temperature constant, wherein the block heats the bottom plate assembly.

11. The method of claim 10 further comprising monitoring, by a thermostat attached to the block, a temperature of the block.

12. The method of claim 10 wherein the block is bolted to the bottom surface.

13. The method of claim 10 wherein the block is glued to the bottom surface.

14. The method of claim 10 wherein the block comprises a recessed cavity, wherein the heater is attached to the recessed cavity, and wherein the temperature sensor is attached to the recessed cavity.

15. The method of claim 11 wherein the block comprises a recessed cavity, wherein the thermostat is attached to the recessed cavity.

16. The method of claim 10 wherein a thermal mass of the block is sufficient such that the block temperature is maintained with a temperature stability of less than or equal to 0.01 degrees C., without insulation.

17. The method of claim 10 further comprising conducting heat through a thermally conductive material between the block and the bottom surface.

18. The method of claim 10 wherein the field flow fractionator comprises the temperature controller.

* * * * *